United States Patent
Wiklund

(10) Patent No.: US 9,074,845 B2
(45) Date of Patent: Jul. 7, 2015

(54) FIRE-CONTROL SYSTEM

(75) Inventor: Ralf Wiklund, Odakra (SE)

(73) Assignee: GS Development AB, Malmo (SE)

(*) Notice: Subject to any disclaimer, the term of this patent is extended or adjusted under 35 U.S.C. 154(b) by 0 days.

(21) Appl. No.: 13/983,446

(22) PCT Filed: Feb. 14, 2012

(86) PCT No.: PCT/SE2012/050153
§ 371 (c)(1),
(2), (4) Date: Oct. 15, 2013

(87) PCT Pub. No.: WO2012/112111
PCT Pub. Date: Aug. 23, 2012

(65) Prior Publication Data
US 2014/0026464 A1 Jan. 30, 2014

(30) Foreign Application Priority Data
Feb. 14, 2011 (SE) ..................... 1150113

(51) Int. Cl.
*F41G 1/00* (2006.01)
*F41G 1/30* (2006.01)
*F41G 3/06* (2006.01)
*G02B 23/10* (2006.01)
*F41G 1/473* (2006.01)
*F41G 3/08* (2006.01)

(52) U.S. Cl.
CPC .. *F41G 1/00* (2013.01); *F41G 1/30* (2013.01); *G02B 23/10* (2013.01); *F41G 1/473* (2013.01); *F41G 3/06* (2013.01); *F41G 3/08* (2013.01)

(58) Field of Classification Search
CPC ............. F41G 1/00; F41G 1/30; F41G 1/473; F41G 3/06; F41G 3/08; G02B 23/10
USPC ............................ 42/111, 113, 131, 132, 142
See application file for complete search history.

(56) References Cited

U.S. PATENT DOCUMENTS

| 3,892,474 | A | | 7/1975 | Nilsson |
| 4,965,439 | A | * | 10/1990 | Moore .......................... 235/404 |
| 5,355,224 | A | * | 10/1994 | Wallace ........................ 359/631 |
| 7,257,920 | B1 | * | 8/2007 | Shaffer et al. .................. 42/118 |
| 2002/0176151 | A1 | * | 11/2002 | Moon et al. ................... 359/298 |
| 2005/0252062 | A1 | * | 11/2005 | Scrogin et al. ................. 42/119 |
| 2006/0162226 | A1 | | 7/2006 | Tai |
| 2007/0180751 | A1 | | 8/2007 | Joannes |
| 2012/0159833 | A1 | * | 6/2012 | Hakanson et al. .............. 42/131 |

* cited by examiner

FOREIGN PATENT DOCUMENTS

| JP | 4-318809 | 4/1992 |
| WO | WO 2009/092673 | 7/2009 |
| WO | WO 2011/003814 | 1/2011 |

OTHER PUBLICATIONS

International Search Report and Written Opinion for International Application No. PCT/SE2012/050153 mailed May 20, 2012 (11 pages).

*Primary Examiner* — Bret Hayes
(74) *Attorney, Agent, or Firm* — Merchant & Gould P.C.

(57) ABSTRACT

A fire-control system comprising a housing, a light channel, through which a user may directly observe a target and receive visually displayed information simultaneously, where the light channel comprises partially reflective optics, a light source adapted to emit light to the partially reflective optics via an optical path, providing light for a reticle visible for a user, and a control unit for receiving a measure of the distance to the target and for determining the adequate position of the reticle, based on the distance to the target, wherein at least one tiltable mirror is arranged in the optical path such that the position of the reticle in controllable by the tilt of the mirror.

8 Claims, 2 Drawing Sheets

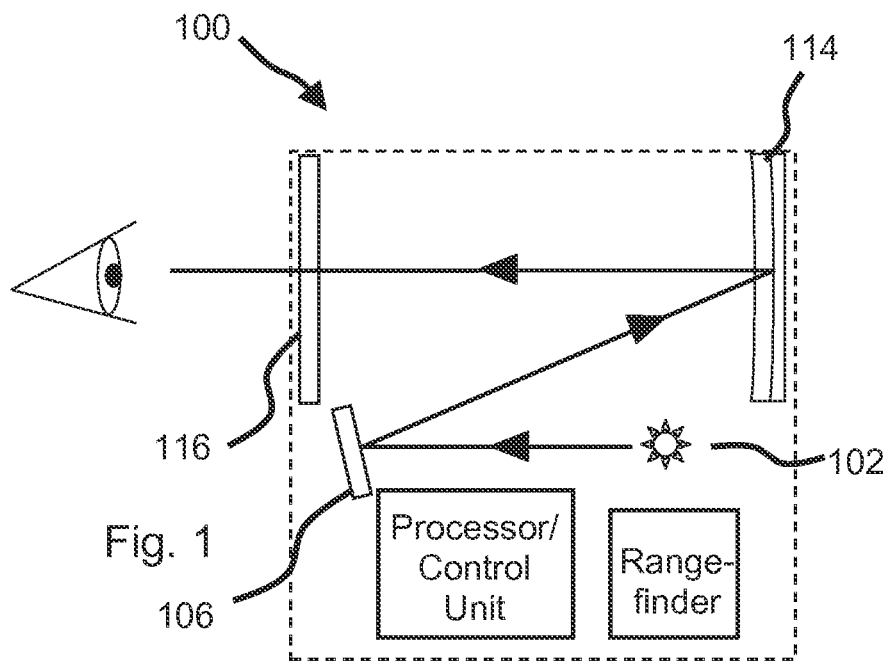
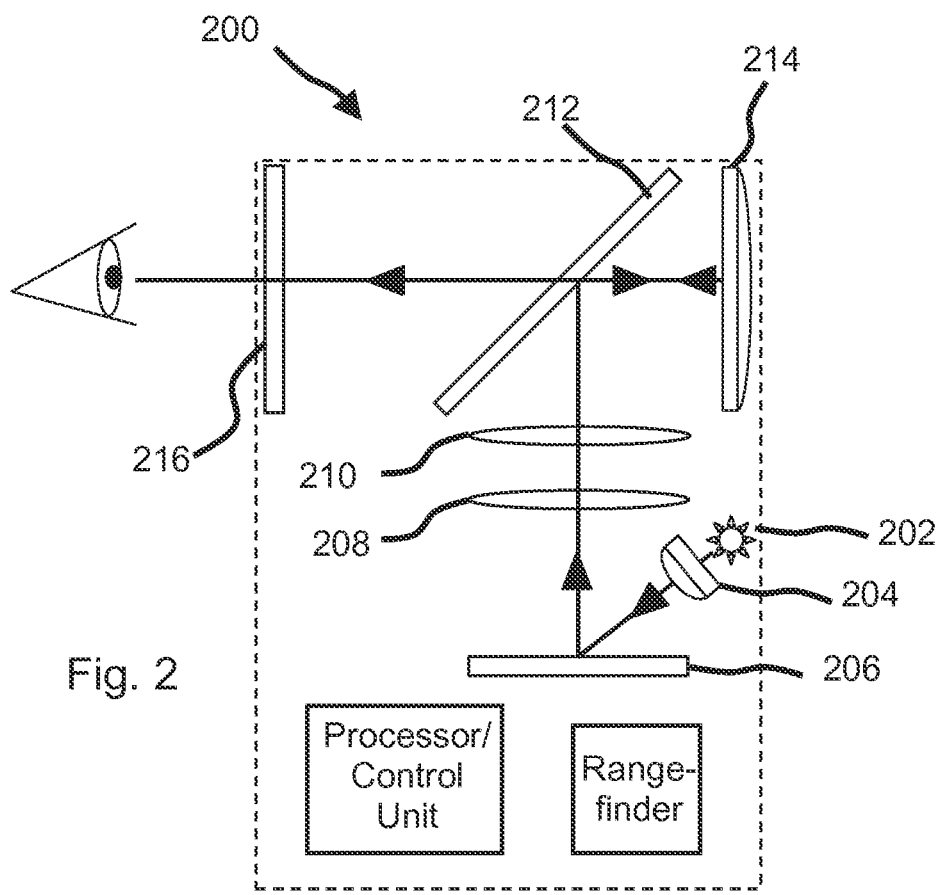

FIRE-CONTROL SYSTEM

This application is a National Stage Application of PCT/SE2012/050153, filed 14 Feb. 2012, which claims benefit of Serial No. 1150113-7, filed 14 Feb. 2011 in Sweden and which applications are incorporated herein by reference. To the extent appropriate, a claim of priority is made to each of the above disclosed applications.

FIELD OF THE INVENTION

The present invention relates to a fire-control system, and in particular to a fire-control system adapted for use with a weapon firing ammunition with a relatively high trajectory or firing with low-trajectory ammunition at longer distances. The invention also relates to a method of displaying a reticle and to a computer program for executing said method.

TECHNICAL BACKGROUND

When using ammunition with low exit velocity, high trajectory or firing at targets at a significant distance, where the time of flight is significant, the weapon sight has to have certain properties. In such conditions the barrel of the weapon needs to have a considerable elevation in order for the ammunition to reach the target. A normal sight will generally not suffice, since it is difficult or impossible to have a visual contact with the target via the sight and at the same time have the correct inclination of the barrel, thus aiming is impossible. Also the sight may need to cover a considerable interval of inclinations, which introduces further limitations. In this context it should be clarified that some weapons/ammunitions have an inherent high trajectory, while others only have high trajectory when applied under certain conditions, e.g. ammunition normally following a level trajectory in shorter ranges will generally fall within the definition of high trajectory if the distance they travel to the target is considerable. For the purpose of the present invention this is the relevant definition of high trajectory.

The known solution to the above problem has been to incorporate an iron sight, similar to those used for historical long guns, with a foldable primary part including distance markings, e.g. tang sight or ladder sight, such that if the distance is known, the correct distance marking can be used. This type of sight is still used, since it provides a rugged, simple solution.

The present applicant has presented a solution to the above problem in WO 2009/092673.

The solution presented in the above application features the use of a two-dimensional RCLED display (RCLED—Resonant Cavity LED), which may be used to image several different reticles, compensated for distance to target or other factors. The use of RCLEDs enables a rugged technical solution with comparably low power consumption. The manufacture of RCLEDs, and in particular two-dimensional arrays of RCLEDs is highly complex, which affects the cost of this component, and of the fire-control system. Though the known product has excellent characteristics there is still room for new products within the present field.

When using high-trajectory ammunition in a field condition it is obviously important to maintain an elevated awareness regarding the events in the surroundings. Therefore it is beneficial and desired to have a fire-control system that does not include optics or electronics distorting the field of view, e.g. an optical or electronic system that creates a real or imaginary image of the target which is not in the line of sight between the aiming eye of the user and the actual target. Also, it is beneficial to be able to look at the target with the other eye while aiming. For this reason a sight, or a fire-control system, in accordance with the present invention is a low-magnification sight or more preferably a non-magnifying sight, in which the view of the target is essentially unaffected by the presence of the sight between the eye of the user and the target.

SUMMARY OF THE INVENTION

To this end an inventive fire-control system comprises: a housing; partially reflective optics, through which a user may observe a target and receive visually displayed information simultaneously; a light source, for generation of the light for a reticle; means for receiving a measure of the distance to the target; a processor, for determining the adequate position of the reticle, based on the distance to the target, and for controlling the tilt of at least one tiltable mirror arranged in the beam path between the user and the light source so that the reticle may visualized at the adequate position. As used herein "tiltable" includes that the inclination of the mirror may be altered in three dimensions or along two axes, and it is thus not limited to the mirror being pivoted around a single axis. The at least one tiltable mirror may also be used for visualization of other information, such as text, numbers or images.

According to one embodiment the light-source is a single point source, preferably an RCLED and the tiltable mirror is used to direct the light from the light source such that the reticle is imaged in the correct position. According to this embodiment the only movable component is the tiltable mirror, which vouches for the possibility to construct a rugged device.

According to another embodiment the light source is arranged to illuminate a two-dimensional array of individually controllable micro-mirrors. This setup enables for the array to direct only one, or a selected portion of all the controllable micro-mirrors in such a way that the light is forwarded towards the eye of the user, whereby a reticle may be formed. One commercial example of such a micro-mirror array is device is DMD (Digital Micromirror Device) controlled by DLP (Digital Light Processing). Such devices are present in e.g. display apparatuses such as projectors, and one alternative possible is the TALP1000B micromirror provided by Texas Instruments. In this embodiment it may suffice to be able to arrange each mirror in one position where light is forwarded into the optical path to form an image to the user and one position where the light is not, i.e. a bistable mirror suspension.

According to one embodiment the mirror of any previous embodiment is coated such as to reflect light of the specific wavelength or wavelength interval emitted by the light source.

The main purpose of the sight is obviously to assist the user in striking the target, and the fire-control system will provide a reticle to be superimposed on the target. It should be noted that there are other possibilities than to superimpose a reticle. The reticle could have another form, such as a crosshair form or a circular form, and these embodiments fall within the scope of the claim. The mirror enables the display of a reticle, which is movable in a vertical direction, so as to be able to mark a reticle for various distances to a target.

The position of the reticle is calculated on basis of the measured distance to the target. In the case of a miss of the target, the possibility of displaying several reticles may be useful when correcting the position of the reticle, e.g. by letting the used reticle remain on the target while another reticle is electronically moved the actual point of impact. In this way the processor may correct the calculation of the reticle so that the next firing will result in a hit.

The processor may include tables and/or algorithms regarding the performance of various types of ammunition. The apparent parameter needed is related to the trajectory for various distances, since the position of the reticle relies on this type of data. However, the processor enables far more advanced maneuvers, such as correction for wind speed, inclination, air pressure, humidity, corrections etc, and makes the fire-control system very versatile. Therefore, in one or more embodiments the fire-control system may also contain data regarding various types of ammunition, and in such cases this data is included in the acquisition of the position of the reticle. This acquisition may also include data regarding air speed, air temperature, humidity, tilt of the weapon in a cross direction, and other factors affecting the trajectory of the ammunition, and the choice of reticle. One further example is that there are two elevations for which the ammunition will hit the target, a lower elevation—resulting in a lower trajectory—and a higher elevation—resulting in a higher trajectory. Depending on the type of target, the terrain in front of the target, and the ammunition either the higher or the lower trajectory may be preferred. By providing the desired scenario to the CPU it may, if geometrically possible, show either one or both of the applicable reticles.

In the above context the term "position" relates to the position in a plane orthogonal to the line of sight between the eye of the user and the target. However, in many applications it is also important at what distance from the users eye the image of the lit part, i.e. the reticle, of the light source is located.

The optics displaying the reticle for the user may comprise optics being adapted to create an image of the reticle which is essentially parallax free relative to the target. An essentially parallax free reticle significantly simplifies the task of the user, since there is no requirement to align any other components than to simply superimpose the reticle on the target and fire. If high-trajectory ammunition is used, the sight window through which the user observes the target is generally significantly larger than what is used for a normal telescopic sight since it should allow for a significant inclination of the weapon, and thus of the fire-control system, with maintained visual contact with the target through the fire-control system. An essentially parallax free reticle is generally created by having the optics generating an image at an infinite distance from the user, or at a typical distance for use, such as 300 m. This also means that the normal human eye may be relaxed, for the benefit of the user's ability to concentrate during long time. If the reticle is located at an infinite distance from the users eye, or 300 m, and the target is located 100 m away, there will be some parallax, though it has no significant impact on the precision of the weapon, as long as the user may still superpose the reticle on the target while looking in the fire-control system. Due to the fact that targets will be located at various distances a completely parallax free reticle is very difficult to achieve, which is why the word "essentially" have to be included. For the purpose of this invention "essentially parallax free" optics having inherent very low dependency on distance to observed object with regard to showing little or no parallax effects.

In one or more embodiments the fire-control system may be combined with equipment for infrared illumination and/or night-vision systems, which may increase the usability of the fire-control system.

BRIEF DESCRIPTION OF THE DRAWINGS

FIG. 1 is a schematic illustration of a fire-control system according to a first embodiment of the invention, in a side view.

FIG. 2 is a schematic illustration of a fire-control system in accordance with a second embodiment of the present invention.

DESCRIPTION OF EMBODIMENTS

Figure 3A:
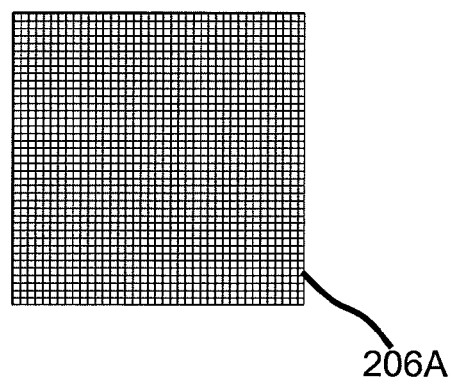
FIGS. 3a and 3b are schematic front views of micro-mirror arrays which may be used in connection to a sight in accordance with the second embodiment.

FIG. 1 is a schematic view of a sight 100 according to a first embodiment of the present invention. In this embodiment a light source 102, preferably a point source such as a single LED or more preferably an RCLED provides the light for a reticle to be visualized. The optical path of the light is illustrated by the full line on which arrow heads indicate the direction. After being deflected by the tiltable mirror 106 the light is reflected off the component 114 by which it is directed towards the user (indicated by the eye). An optical flat (glass window) 116 is arranged between the components 114 and the eye of the user. Returning to the component 114 this preferably has the properties of a parabolic mirror with respect to the light from the light source 102, yet for most embodiments it comprises a mangin mirror, which is less complicate to manufacture than an actual parabolic mirror. It should also be noted that the user observes a target area through the components 114 and 116. Because of this the component 114 also preferably comprises a compensating arrangement such that distortion of the target area is kept as low as possible. This also implicates that the reflective surface of the mangin mirror is accomplished by a coating reflecting the wavelength of wavelength interval emitted by the light source while transmitting all other visible wavelengths.

As the range to a target is acquired a control unit may determine the correct tilt for the mirror 106, resulting in the correct position for the reticle. Further imaging optics may be arranged in the optical path between the light source and the semitransparent component 114.

The dotted frame indicates that the illustrated components are arranged within a housing of the fire-control system.

In the second embodiment of the sight 200, as illustrated by the schematic illustration of FIG. 2, there are some clear differences, in respect of how the position of the reticle is controlled. In this embodiment the light-source 202 illuminates a two-dimensional array 206 of micro-mirrors, optionally via additional optics 204. The optics 204 may serve to ensure an even illumination of the micro-mirror device 206. In the least complex embodiment each micro-mirror may assume two positions. In a first position it forwards the light from the light source towards the eye of the user, and in a second position it does not. Additional optics 208, 210, 212, 214 is used to image the micro-mirror device to the user. The component 214 may have similar properties as the component 114 of the first embodiment, and it may be a mangin mirror as well.

A control unit may determine which of the micro-mirrors that should be positioned in the first position, and thereby determine the position of the imaged reticle (or other visually displayed information such as text, numerals or images). A potential drawback of this embodiment is that only a small portion of the emitted light is forwarded to the user, and it is therefore not as energy efficient as the first embodiment. Therefore embodiments where the micro-mirrors may be controlled to more positions than the on or off position described above are contemplated. In such an embodiment several micro-mirrors may be used for imaging a single reticle.

The function of micro-mirror devices has been described before, and it will not be disclosed any further here.

Figure 3B:
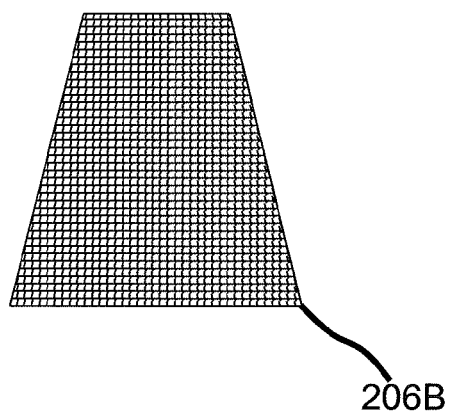

FIGS. 3A and 3B illustrate two alternative embodiments of micro-mirror arrays 12, which may be used in relation to the present invention. The array disclosed in FIG. 3A is of standard design in regard of its shape (being rectangular or quadratic), and the array of FIG. 3B has been invented for use in the present fire-control system and has a trapezoid shape. The shorter of the parallel sides of the trapezoid has a width of about 30-50 pixels, e.g. 40 mirrors, and the longer of the parallel sides has a width of about 100-140 mirrors, e.g. 120 mirrors. The distance between the parallel sides may be about 150-200 mirrors, e.g. 175 mirrors. Other trapezoid shapes are feasible without departing from the scope of this part of the present invention.

The trapezoid shape will result in several advantages, all relating to the fact that the function of the array will be maintained while its area will be reduced (both as compared to a conventional rectangular array). Firstly, and perhaps most importantly, the present applicant has not revealed any significant disadvantages, which makes it easier to appreciate the advantages. One advantage is that during production the inventive design enables more arrays to be produced per unit area. The array of FIG. 3B is arranged in the fire-control system 1 so that the narrow end may be used to image the reticle for targets being far away. The shape of the array results in a fewer number of pixels, which increases the yield during production.

The image generated by an inventive sight may be a virtual image created at an infinite distance from the user, in order to relax the eye of the user maximally.

Optionally a laser rangefinder (not shown) may be incorporated in the present sight. Such a laser rangefinder may be of standard type operating at 1550 nm (not visible with standard night-vision systems) which may also be the case for the processing hardware, software and storage capabilities utilized. Other standard wavelengths used are around 900 nm, still in the infrared, and visible light. The latter having the disadvantage of exposing a visible flash of light.

The distance to the target is generally measured with the rangefinder and automatically forwarded to the control unit, yet a distance setting could also be input by the user, or by the sight receiving information by other means. The same is true for the type of ammunition, which either is detected automatically or input by the user.

The housing of the sight needs to be rigid and durable. In one embodiment it is made of extruded, high strength aluminum, which is anodized, providing a strong, rigid and durable housing with a low weight. Instead of being extruded the housing may also be machined from a solid piece or from a mould of base material. There are other alternatives for the housing too, such as reinforced plastics or composite materials. For the first embodiment actual control of the RCLED intensity may be performed by varying pulse length to the RCLED in such a way that the human eye interprets it like a variation in intensity. This control method is thoroughly described in the application EP 1 210 561 A by the present applicant and will not be described in any further detail here, though the relevant details of said application are incorporated by reference. Also adjusting the current in the pulses can be used to increase the range in which the intensity can be set. This is particularly important when using NVD.

The invention claimed is:

1. A fire-control system comprising
a housing,
a light channel, through which a user may directly observe a target and receive visually displayed information simultaneously, said light channel comprising partially reflective optics,
a light source adapted to emit light to the partially reflective optics via an optical path, providing light for a reticle or other information visible for a user, the reticle having a position,
a control unit for receiving a measure of a distance to a target and for determining an adequate position of the reticle, based on the distance to the target, and
at least one mirror assembly comprising a plurality of micro-mirrors arranged in a two-dimensional array, wherein each micro-mirror has an adjustable angle;
wherein the at least one mirror assembly is arranged in the optical path such that the position of the reticle is controllable by adjusting the angle of one or more micro-mirrors wherein each micro-mirror can be controlled to assume at least two positions, with a first position where the micro-mirror is arranged to forward light from the light source towards an eye of the user via imaging optics arranged in the optical path between the mirror assembly and the partially reflective optics, and a second position where the micro-mirror does not forward light towards the eye of the user, and wherein the control unit is configured to determine which of the micro-mirrors should be positioned in the first position, and thereby determine the position and image of the reticle.

2. The fire-control system of claim 1, wherein the tiltable mirror defines a planar surface.

3. The fire-control system of claim 1, wherein the array has a trapezoid shape.

4. The fire-control system of claim 1, wherein the fire-control system further comprises a rangefinder within its housing.

5. The fire-control system of claim 1, wherein the optics displaying the reticle for the user comprise optics being adapted to create an image of the reticle which is essentially parallax free relative to the target.

6. The fire-control system of claim 1, wherein the angle of each micro-mirror may be altered in three dimensions or along two axes relative to the housing.

7. The fire-control system of claim 1, wherein the light source comprises a single point source.

8. The fire-control system of claim 1, wherein the micro-mirrors are individually controllable.

* * * * *